(12) United States Patent
Rudi et al.

(10) Patent No.: US 10,774,931 B2
(45) Date of Patent: Sep. 15, 2020

(54) PISTON

(71) Applicant: Mahle International GmbH, Stuttgart (DE)

(72) Inventors: Juergen Rudi, Ludwigsburg (DE); Ralf Braig, Schorndorf (DE)

(73) Assignee: MAHLE INTERNATIONAL GMBH (DE)

(*) Notice: Subject to any disclaimer, the term of this patent is extended or adjusted under 35 U.S.C. 154(b) by 0 days.

(21) Appl. No.: 15/769,336

(22) PCT Filed: Oct. 4, 2016

(86) PCT No.: PCT/EP2016/073606
§ 371 (c)(1),
(2) Date: Apr. 18, 2018

(87) PCT Pub. No.: WO2017/067778
PCT Pub. Date: Apr. 27, 2017

(65) Prior Publication Data
US 2018/0306320 A1    Oct. 25, 2018

(30) Foreign Application Priority Data
Oct. 19, 2015   (DE) .................. 10 2015 220 261

(51) Int. Cl.
*F16J 1/16*    (2006.01)
*F02F 3/02*    (2006.01)
(Continued)

(52) U.S. Cl.
CPC ............ *F16J 1/16* (2013.01); *F02F 3/02* (2013.01); *F02F 3/022* (2013.01);
(Continued)

(58) Field of Classification Search
CPC .......... F16J 1/16; F16C 33/1065; F02F 3/022; F02F 3/0015
See application file for complete search history.

(56) References Cited

U.S. PATENT DOCUMENTS

| | | | | |
|---|---|---|---|---|
| 4,506,632 A | * | 3/1985 | Kanda | ............ F01M 1/08 |
| | | | | 123/193.6 |
| 5,746,169 A | * | 5/1998 | Issler | ............ F02B 23/0672 |
| | | | | 123/193.6 |

(Continued)

FOREIGN PATENT DOCUMENTS

| | | |
|---|---|---|
| CN | 102713372 A | 10/2012 |
| CN | 104813080 A | 7/2015 |

(Continued)

OTHER PUBLICATIONS

English abstract for H-09-079377.
(Continued)

Primary Examiner — Hung Q Nguyen
Assistant Examiner — Brian P Monahon
(74) Attorney, Agent, or Firm — Fishman Stewart PLLC

(57) ABSTRACT

A piston for an internal combustion engine may include two pin bosses configured to receive a gudgeon pin. The two pin bosses may respectively include a nadir pocket of at least two nadir pockets at α=180° and extending outward from a piston axis. The at least two nadir pockets may have a respective length that is smaller than a length of a respective pin boss of the at least two pin bosses. The piston may also include a pin boss axis that is axially offset from the piston axis by 0.1-1.0 mm.

20 Claims, 2 Drawing Sheets

(51) Int. Cl.
*F02F 3/00* (2006.01)
*F16C 33/10* (2006.01)

(52) U.S. Cl.
CPC ............ *F16C 33/1065* (2013.01); *F02F 3/00* (2013.01); *F02F 3/0015* (2013.01)

(56) References Cited

U.S. PATENT DOCUMENTS

| | | | | |
|---|---|---|---|---|
| 5,894,824 | A * | 4/1999 | Watanabe | F02F 3/022 |
| | | | | 123/193.6 |
| 6,345,569 | B1 * | 2/2002 | Take | F02F 3/022 |
| | | | | 92/208 |
| 6,513,477 | B1 * | 2/2003 | Gaiser | F02F 3/003 |
| | | | | 123/193.6 |
| 6,539,910 | B1 * | 4/2003 | Gaiser | F02F 3/003 |
| | | | | 123/193.6 |
| 7,305,960 | B2 * | 12/2007 | Zvonkovic | F16J 1/16 |
| | | | | 123/193.6 |
| 7,845,269 | B2 * | 12/2010 | Hayes | F01M 11/02 |
| | | | | 92/187 |
| 8,011,287 | B2 * | 9/2011 | Fezer | F16J 1/16 |
| | | | | 92/187 |
| 8,360,026 | B2 * | 1/2013 | Issler | F16J 1/16 |
| | | | | 123/193.6 |
| 8,863,719 | B2 | 10/2014 | Boekle et al. | |
| 9,784,210 | B2 | 10/2017 | Issler | |
| 9,970,384 | B2 * | 5/2018 | Muscas | F02F 3/003 |
| 2006/0021500 | A1 * | 2/2006 | Anderson | F16C 33/1065 |
| | | | | 92/158 |
| 2006/0027095 | A1 * | 2/2006 | Miller | F02F 3/00 |
| | | | | 92/208 |
| 2008/0245229 | A1 * | 10/2008 | Buschbeck | B22D 19/0027 |
| | | | | 92/186 |
| 2009/0107466 | A1 * | 4/2009 | Berger | F02B 75/045 |
| | | | | 123/48 B |
| 2009/0114087 | A1 * | 5/2009 | Fezer | F16C 5/00 |
| | | | | 92/187 |
| 2010/0162986 | A1 * | 7/2010 | Grossle | F02B 23/06 |
| | | | | 123/193.6 |
| 2010/0300396 | A1 * | 12/2010 | Issler | F16J 1/16 |
| | | | | 123/197.1 |
| 2011/0107997 | A1 * | 5/2011 | Muscas | F02F 3/003 |
| | | | | 123/193.6 |
| 2012/0037112 | A1 * | 2/2012 | Muscas | F02F 3/003 |
| | | | | 123/193.6 |
| 2013/0000591 | A1 * | 1/2013 | Boekle | F16J 1/16 |
| | | | | 123/193.6 |
| 2014/0150747 | A1 * | 6/2014 | Lochmann | F02F 3/00 |
| | | | | 123/193.6 |
| 2015/0308370 | A1 * | 10/2015 | Issler | F16J 1/16 |
| | | | | 123/193.6 |

FOREIGN PATENT DOCUMENTS

| | | |
|---|---|---|
| DE | 1048752 B | 10/1957 |
| DE | 1650206 A1 | 8/1970 |
| DE | 2152752 A1 | 4/1972 |
| DE | 10101605 A1 | 7/2002 |
| DE | 102007060473 A1 | 6/2009 |
| DE | 102012022913 A1 | 5/2014 |
| FR | 1239739 A | 8/1960 |
| GB | 1206878 A | 9/1970 |
| JP | H-09-079377 A | 3/1997 |
| JP | 2009-532611 A | 9/2009 |
| KR | 10-2010-0099229 A | 9/2010 |
| KR | 20120094950 A | 8/2012 |

OTHER PUBLICATIONS

Korean Office Action in the parallel Korean Patent application No. 10-2018-7010796 dated May 10, 2018.
Chinese Office Action in the parallel Chinese Patent application No. 201680059930.1 dated Oct. 15, 2018.
Japanese Notice of Allowance in the parallel Japanese Patent application No. 2018-516175 dated Nov. 13, 2018.
English Translation of Japanese Notice of Allowance in the parallel Japanese Patent application No. 2018-516175 dated Nov. 13, 2018.
Korean Office Action in the parallel Korean Patent application No. 10-2018-7010796 dated Nov. 22, 2018.
English abstract for DE-10101605.

* cited by examiner

PISTON

CROSS-REFERENCE TO RELATED APPLICATIONS

This application claims priority to International Patent Application No. PCT/EP2016/073606 filed on Oct. 4, 2016, and German Application No. DE 10 2015 220 261.5 filed on Oct. 19, 2015, the contents of each of which are hereby incorporated by reference in their entirety.

TECHNICAL FIELD

The present invention relates to a piston for an internal combustion engine having two pin bosses for receiving a gudgeon pin.

BACKGROUND

DE 1 650 206 A has disclosed a piston of the generic type for an internal combustion engine having pin bores for receiving a gudgeon pin, the pin bosses being of transversely oval configuration with respect to the longitudinal axis of the piston for load optimization.

DE 10 2012 022 913 A1 has disclosed a piston of the generic type for an internal combustion engine having a pin boss for receiving a gudgeon pin. Here, the pin boss has a nadir pocket which is arranged at 180°.

If a piston of an internal combustion engine is at top dead center (TDC), a high inertia force acts on a pin boss, in particular in the lower region, that is to say in the nadir region. Here, an initial fracture of the pin boss can lead comparatively rapidly to a total failure of the internal combustion engine.

Up to now, said problem has been counteracted by the wall thicknesses around the pin bosses being increased, which is at the same time associated in an undesired way, however, with an increased weight and, as a result, in turn higher inertia forces. A further possibility consists in configuring the shape in the boss to be asymmetrical, which leads to increased production costs, however, in comparison with simple drilling on account of the complicated manufacture.

SUMMARY

The present invention is therefore concerned with the problem of specifying an improved or at least an alternative embodiment for a piston of the generic type, which embodiment is distinguished, in particular, by inexpensive manufacture and at the same time an increased loadbearing capability.

According to the invention, said problem is solved by way of the subject matter of the independent claim(s). Advantageous embodiments are the subject matter of the dependent claim(s).

The present invention is based on the general concept of providing a nadir pocket in a nadir region of a pin boss, which nadir pocket extends merely over a part of the boss length at the nadir and is capable as a result of moving an introduction of force away from a pin boss edge in the direction of the center of the pin boss. Here, the piston according to the invention for an internal combustion engine has two pin bosses for receiving a gudgeon pin, the pin bosses in each case having a nadir pocket at $\alpha=180°$, that is to say at the nadir, which nadir pockets extend to the outside from a piston axis, that is to say from the center, and run here (as mentioned at the outset) at the nadir merely over a part of the length of the pin boss. Here, a harmonization of the stresses takes place as a result of the movement of the force introduction point, which harmonization leads to a considerable stress reduction. As a result, the service life of the pin boss is increased considerably. In the case of a constant service life, the wall thicknesses of the boss can be reduced by way of the nadir pocket, as a result of which significant weight savings can be achieved, as a result of which the inertia forces of the piston during operation are in turn reduced. If a cross section of the pin boss remains unchanged, higher stresses and therefore a longer service life can be achieved by way of the nadir pockets according to the invention. The pin is deformed in a "banana-shaped" manner as a result of the action of the inertia force, the outer edges of the gudgeon pin being situated closer to the piston crown than in the pin center. High stresses are produced as a result on the inner edge of the pin boss. By way of the nadir pocket, the edge is taken out of contact with the gudgeon pin, and the force introduction point is moved away from the edge in the direction of the boss center (as viewed in the longitudinal direction of the pin boss). According to the invention, a pin boss axis differs from the piston axis here by 0.1-1.0 mm.

In one advantageous development of the solution according to the invention, the nadir pockets extend over merely 10-75% of the length of the pin bosses. It is important here, above all, that the nadir pocket does not run over the entire length of the pin boss, but rather merely over a certain part, which can achieve a situation, in which no introduction of force takes place by way of the gudgeon pin where the nadir pockets are provided.

In a further advantageous embodiment of the solution according to the invention, the nadir pockets have a depth of between 0.1 and 1.0 mm. In the case of a depth of up to 1 mm, weight savings can be achieved which have a particularly favorable effect on the inertia forces during operation of the piston and of an internal combustion engine which is equipped with the latter.

In a further advantageous embodiment of the solution according to the invention, the depth of the nadir pockets decreases toward the outside from the piston axis in the direction of a boss outer side. As a result, in particular, a reduced stress concentration can be achieved.

In a further advantageous embodiment of the solution according to the invention, the nadir pockets extend over a circumferential angle of between 30 and 130° in the region of the nadir. Depending on the desired circumferential angle, the following effects can be achieved in a manner which is associated with this: in the case of a comparatively large circumferential angle, for example, flat rising and falling of the boss face which surrounds the nadir pocket can be brought about, as a result of which, in particular, a considerably more obtuse angle can be achieved in the transition between the boss face and the nadir pocket, obtuse angles of this type being particularly advantageous for stress concentration.

The geometric conditions (length 10-75%; depth 0.1-1.0 mm; circumferential angle) 30-130° together describe the size of the nadir pocket. If the upper limit is reached (large nadir pocket), the mounting of the gudgeon pin is no longer a given, as a result of which noise problems can occur, whereas the effectiveness of said mounting is lost if the lower limit is reached (small nadir pocket). The optimum of the nadir pocket lies between the upper and lower limit.

In a further advantageous embodiment of the solution according to the invention, the pin bosses have a superimposed transverse ovality. A transverse ovality of this type is distinguished, for example, by the fact that the pin boss is of circular-cylindrical configuration at the zenith and is of oval configuration with an oil retaining volume in the case of α being approximately 90°, respectively 270°, that is to say at the equator. Here, a transition between the equator and the zenith should preferably run without edges. By way of the special embodiment of the pin bosses, the introduction of force is moved into the boss zenith, as a result of which the circumferential stresses in the boss are reduced and the loadbearing capability of the boss rises as a result. By way of a transversely oval configuration of this type, considerably improved lubrication of the pin can also be achieved than is possible, for example, in the case of a purely cylindrical pin boss.

In a further advantageous embodiment of the solution according to the invention, the pin bosses have a circumferential lubricating groove. As a result of a lubricating groove of this type, particularly satisfactory lubrication of the boss and the pin is possible, as a result of which smooth running and, as a result, a high service life expectancy can be achieved.

Further important features and advantages of the invention result from the subclaims, from the drawings and from the associated description of the figures using the drawings.

It goes without saying that the features which are mentioned in the above text and are still to be described in the following text can be used not only in the respectively specified combination, but rather also in different combinations or on their own, without departing from the scope of the present invention.

BRIEF DESCRIPTION OF THE DRAWINGS

Preferred exemplary embodiments of the invention are shown in the drawings and will be described in greater detail in the following description, identical designations relating to identical or similar or functionally identical components.

In the drawings, in each case diagrammatically.

DETAILED DESCRIPTION

Figure 1:
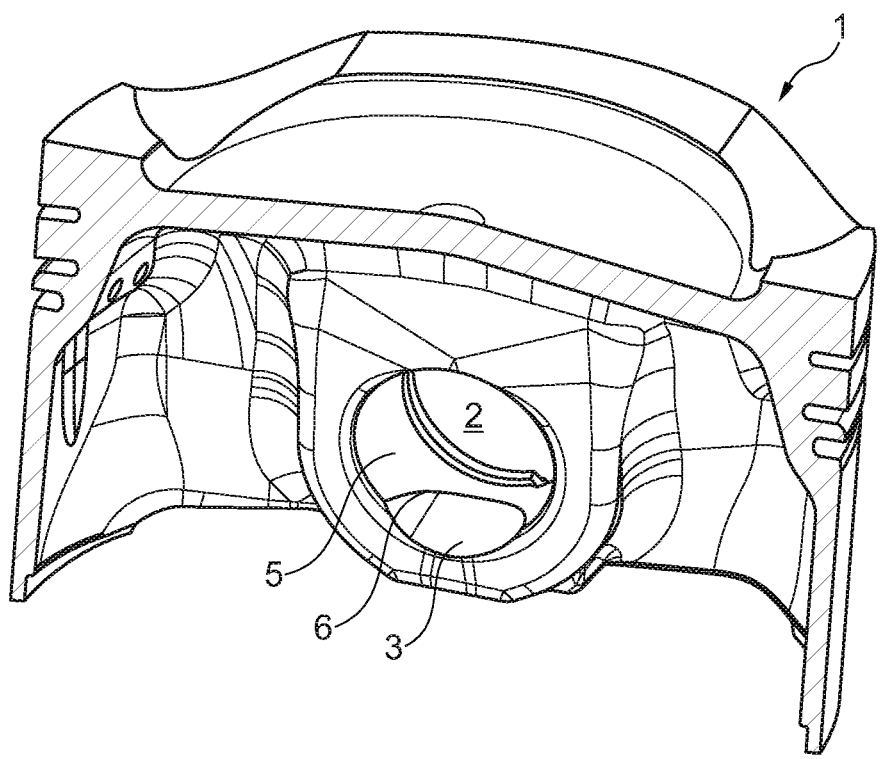
FIG. 1 shows a sectioned view of a piston according to the invention.
Figure 2:
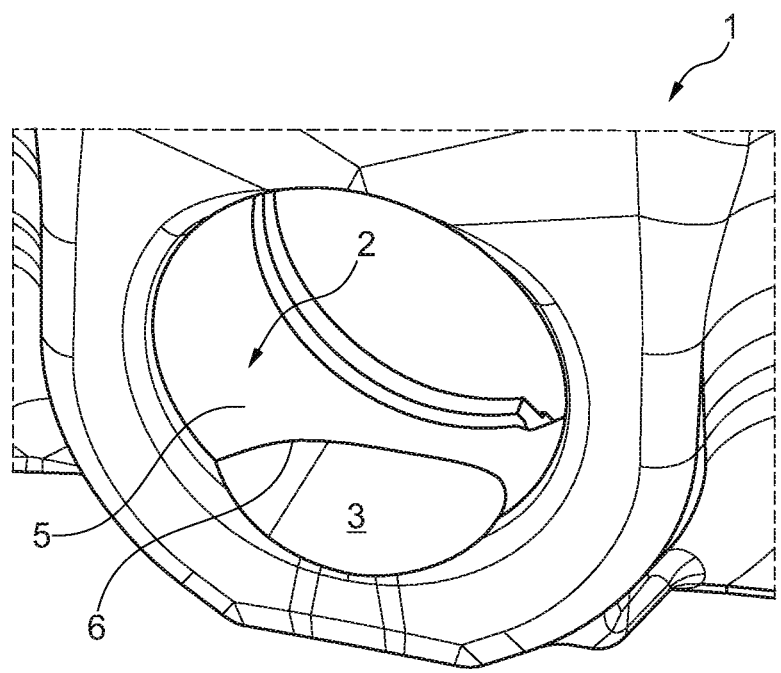
FIG. 2 shows a detailed illustration from FIG. 1 in the region of a nadir pocket.
Figure 3:
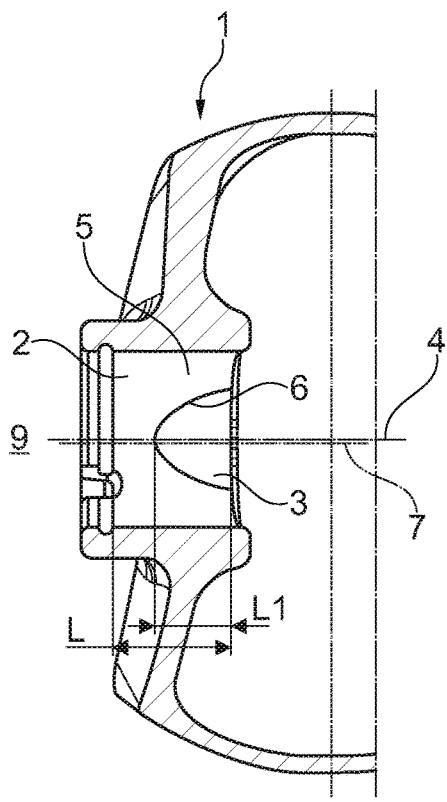
FIG. 3 shows a further sectional illustration through the piston according to the invention in the region of a pin boss, with a plan view of the nadir pocket according to the invention.
Figure 4:
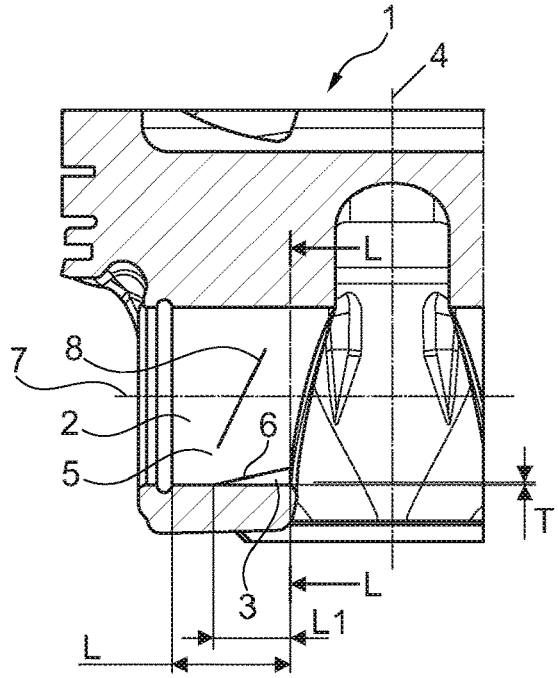
FIG. 4 shows a further sectional illustration through the piston according to the invention, FIG. 5 likewise shows a sectional illustration through the piston according to the invention.

In accordance with FIGS. 1-5, a piston 1 according to the invention for an internal combustion engine (otherwise not shown) has two pin bosses 2, of which merely one is shown in FIGS. 1-3 and 5, a gudgeon pin for fastening a connecting rod to the piston 1 being received in the pin bosses 2 in the case of an assembled internal combustion engine. According to the invention, the pin bosses 2 then have a nadir pocket 3 in each case at α=180° (nadir), which nadir pocket 3 extends to the outside 9 from a piston axis 4 (cf. FIGS. 4 and 5) and runs merely over a part, namely over a length L1, of the entire axial length L of the pin boss 2 at the nadir.

If, for example, FIGS. 1-4 are considered, it can be seen that the nadir pockets 3 extend over a length L1 of approximately 60% of the length L of the pin boss 3. Here, a depth T of the nadir pockets 3 is between 0 and 1.0 mm, the depth T being measured at the nadir, that is to say at α=180°. The depth T decreases toward a surrounding boss face 5, and likewise toward the outside 9 from the piston axis 4. Here, a transition between the nadir pocket 3 and the boss face 5 which surrounds it is described by a parabolic edge 6 (cf. FIGS. 1-4). The lower the depth T of the nadir pocket 3 at the nadir itself, the more obtuse is the transition angle at the edge 6.

Figure 5:
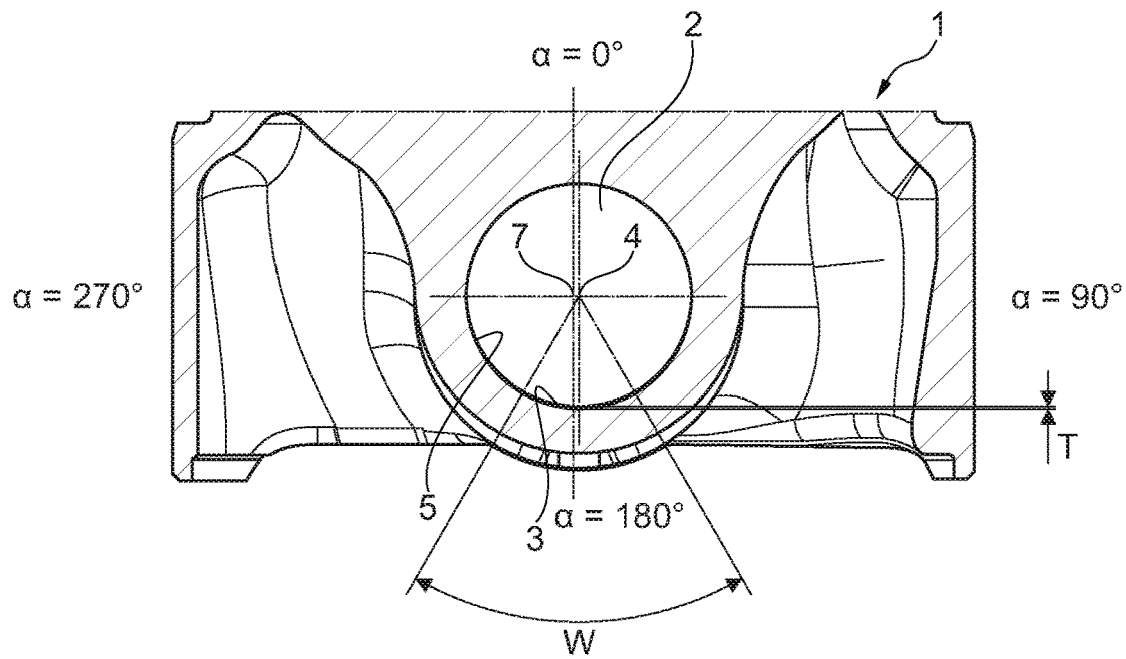

If FIG. 5 is considered, it can be seen that a pin boss axis 7 differs in the horizontal direction from the piston axis 4, to be precise preferably by between 0.1 and 1 mm. This affords the great advantage that the contact behavior of the piston in the cylinder is defined clearly, as a result of which the acoustics can be influenced positively. An offset of the pin boss axis 7 with respect to the piston axis 4 (axial offset) brings about a modified contact behavior of the piston 1 during the changeover, and influences the lateral forces and impact impulses decisively. The position and magnitude of the offset with respect to the piston axis 4 can be optimized by way of a calculation of the piston movement, and the piston running noise and the risk of cavitation on the cylinder liner can thus be reduced considerably.

In a further advantageous embodiment of the solution according to the invention, the nadir pockets 3 extend over a circumferential angle (cf. FIG. 5) of between 30° and 130°. The force introduction point of a pin into the boss face 5 can be influenced indirectly by way of the magnitude of the circumferential angle W, since, for example, the greater the circumferential angle W and the deeper the depth T of the nadir pocket 3, the further a force introduction point is moved in the direction of a snap ring. In the case of floating pin mounting, the gudgeon pin is held in the pin boss merely axially by way of snap rings, whereas, in the case of a shrink fit, the gudgeon pin is shrink-fitted on the connecting rod, that is to say fixedly, and can move only in the pin boss. In the case of a shrink fit, no snap rings are accordingly required.

In a further advantageous embodiment of the solution according to the invention, the pin bosses 2 are of symmetrical or asymmetrical configuration and have, for example, a superimposed transverse ovality and/or a superimposed vertical ovality. In the case of the vertical ovality, the introduction of force takes place on the left and on the right outside the zenith, which results in a stress reduction on the crown.

The pin bosses 2 expediently have oil pockets, in particular narrow straight oil pockets (slots), large straight oil pockets or oblique large oil pockets (side reliefs). An oil retaining volume can be provided by way of oil pockets of this type, as a result of which the lubrication between the pin boss 2 and the gudgeon pin can be improved and therefore the service life of the piston 1 can be increased. For improved lubrication, a circumferential lubricating groove 8 (cf. FIG. 4) can additionally be provided in the pin boss 2.

By way of the piston 1 according to the invention and, in particular, the nadir pockets 3 which are provided according to the invention in the nadir region, a force introduction point can be shifted, in particular, at the top dead center (TDC) of the piston 1, at which a high inertia force acts on the pin boss 2, and a harmonization of the stresses can be achieved as a result, which harmonization leads to a considerable stress reduction. A considerable stress reduction of this type in turn brings about a considerable increase in the service life of the piston 1 according to the invention.

The nadir pocket 3 according to the invention is usually provided only on the inner side, that is to say toward the piston interior; it goes without saying that it is also possible to also provide it on the outside, in particular also as an outer shaped bore.

In general, the following further advantages can be achieved by way of the nadir pockets 3 according to the invention:

an improved oil supply, an optimization of the friction performance as a result of a small contact area, and improved oil supply, a reduction in costs and a lower weight, since the wall thicknesses can be of thinner configuration as a result of the improved introduction of force.

The invention claimed is:

1. A piston for an internal combustion engine, comprising two pin bosses configured to receive a gudgeon pin, the two pin bosses respectively including a nadir pocket of at least two nadir pockets at $\alpha=180°$, the at least two nadir pockets each extending outward from a piston axis and having a respective length along a pin boss axis that is smaller than a length of a respective pin boss of the at least two pin bosses, wherein:

the pin boss axis is axially offset from the piston axis by 0.1-1.0 mm;

a depth of the at least two nadir pockets decreases along the respective length of the at least two nadir pockets from the piston axis toward a respective boss outer side of the two pin bosses;

the depth of the at least two nadir pockets is from 0.1 to 1.0 mm; and the at least two nadir pockets extend over a circumferential angle of 30° to 130°.

2. The piston as claimed in claim 1, wherein the respective length of the at least two nadir pockets is 10-75% of the length of the respective pin boss.

3. The piston as claimed in claim 1, wherein the depth of the at least two nadir pockets decreases from a respective inner side of the at least two nadir pockets proximal to the piston axis to a respective outer side of the at least two nadir pockets remote from the piston axis.

4. The piston as claimed in claim 1, wherein the two pin bosses are configured as one of symmetrically shaped pin bores and asymmetrically shaped pin bores.

5. The piston as claimed in claim 1, wherein the two pin bosses have at least one of a superimposed transverse ovality and a vertical ovality.

6. The piston as claimed in claim 1, wherein the two pin bosses include oil pockets.

7. The piston as claimed in claim 1, wherein the two pin bosses respectively include a circumferential lubricating groove.

8. The piston as claimed in claim 6, wherein the oil pockets are at least one of i) slots, ii) straight oil pockets, and iii) oblique oil pockets.

9. A piston for an internal combustion engine, comprising two pin bosses configured to receive a gudgeon pin;

the two pin bosses respectively including a nadir pocket of at least two nadir pockets at $\alpha=180°$;

the at least two nadir pockets each extending outward from a central piston axis and having a respective length that is smaller than a length of a respective pin boss of the at least two pin bosses;

the at least two nadir pockets having a depth from 0.1 to 1.0 mm, the depth of the at least two nadir pockets continuously decreasing along a pin boss axis in a direction extending away from the central piston axis;

wherein the pin boss axis is axially offset from the central piston axis by 0.1 to 1.0 mm; and wherein, in a cross section perpendicular to the pin boss axis, the two pin bosses respectively define a circular shape along the entire respective length at a zenith disposed proximal to a piston crown relative to the at least two nadir pockets.

10. A piston for an internal combustion engine, comprising two pin bosses configured to receive a gudgeon pin;

the two pin bosses having at least one of a superimposed transverse ovality and a superimposed vertical ovality and respectively having a circumferential boss face in which a nadir pocket of at least two nadir pockets is disposed at $\alpha=180°$;

the at least two nadir pockets each extending outward from a piston axis and over a circumferential angle of 30° to 130°;

the at least two nadir pockets each having a respective length along a pin boss axis that is smaller than a length of a respective pin boss of the at least two pin bosses;

the at least two nadir pockets respectively having a depth of 0.1 to 1.0 mm from the circumferential boss face, the depth of the at least two nadir pockets continuously decreasing along the respective length in a direction extending away from the piston axis; and wherein the pin boss axis is axially offset from the piston axis by 0.1 to 1.0 mm and defines an axis of the circumferential angle.

11. The piston as claimed in claim 10, wherein the nadir pocket extends across 10% to 75% of the length of the respective pin boss from a proximal edge to a distal edge.

12. The piston as claimed in claim 7, wherein the circumferential lubricating groove is disposed spaced apart from the nadir pocket in a circumferential direction of the respective pin boss.

13. The piston as claimed in claim 1, wherein the $\alpha=180°$ is disposed at a nadir of the two pin bosses, and wherein the nadir is disposed opposite to a zenith of the two pin bosses that is arranged proximal to a piston crown with respect to the nadir.

14. The piston as claimed in claim 13, wherein the two pin bosses have a superimposed transverse ovality where the two pin bosses each have a circular cross-sectional shape at the zenith along the entire respective length and an oval shape at an equator of the two pin bosses, the equator disposed at 90° and 270° with respect to the zenith.

15. The piston as claimed in claim 1, wherein the two pin bosses respectively have a circumferential boss face in which the nadir pocket is disposed, and wherein a transition between the boss face and the nadir pocket is defined by a parabolic edge.

16. The piston as claimed in claim 3, wherein the depth of the at least two nadir pockets is from 0.1 to 1.0 mm at a respective nadir and the depth decreases along each circumferential direction of the respective pin boss from the respective nadir.

17. The piston as claimed in claim 15, wherein the parabolic edge defines an obtuse angle.

18. The piston as claimed in claim 1, wherein the pin boss axis defines an axis of the circumferential angle.

19. The piston as claimed in claim 9, wherein the at least two nadir pockets are defined by a depression disposed in a circumferential boss face of each of the two pin bosses, and wherein a transition between the boss face and the nadir pocket is defined by a parabolic edge.

20. The piston as claimed in claim 10, wherein:

the at least two nadir pockets are defined by a depression disposed in the circumferential boss face of each of the two pin bosses;

the at least one of a superimposed transverse ovality and a superimposed vertical ovality includes the superimposed transverse ovality;

the circumferential boss face of each of the two pin bosses has the superimposed transverse ovality such that the two pin bosses each have an oval cross-sectional shape at an equator of the two pin bosses and a circular cross-sectional shape at a zenith, the oval cross-sectional shape and the circular cross-sectional shape extending along the entire respective length of the two pin bosses; and the zenith is arranged proximal to a piston crown with respect to the two nadir pockets, and the equator is disposed at 90° and 270° with respect to the zenith.

* * * * *